United States Patent
Kowalewski et al.

(10) Patent No.: US 8,611,881 B2
(45) Date of Patent: Dec. 17, 2013

(54) METHOD AND DEVICE FOR COMMUNICATION SETUP

(75) Inventors: Frank Kowalewski, Unterhaching (DE); Thomas Luetzenkirchen, Taufkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 966 days.

(21) Appl. No.: 11/867,848

(22) Filed: Oct. 5, 2007

(65) Prior Publication Data

US 2009/0093241 A1 Apr. 9, 2009

(51) Int. Cl.
*H04W 4/00* (2009.01)
*G06F 15/173* (2006.01)
*H04M 3/42* (2006.01)

(52) U.S. Cl.
USPC .... 455/418; 455/426.1; 709/227; 379/202.01

(58) Field of Classification Search
USPC ............... 455/507–520, 466, 426.1; 709/227, 709/230; 379/202.01
See application file for complete search history.

(56) References Cited

U.S. PATENT DOCUMENTS

| | | | |
|---|---|---|---|
| 6,182,146 B1 | 1/2001 | Graham-Cumming, Jr. | |
| 6,941,148 B2 * | 9/2005 | Hansmann et al. | 455/466 |
| 7,039,710 B2 * | 5/2006 | Khartabil | 709/227 |
| 2005/0064821 A1 * | 3/2005 | Hedberg et al. | 455/67.11 |
| 2007/0055660 A1 * | 3/2007 | Anderson | 707/4 |
| 2007/0064900 A1 * | 3/2007 | Kowalewski et al. | 379/202.01 |
| 2008/0153479 A1 * | 6/2008 | Venkitaraman et al. | 455/426.1 |

OTHER PUBLICATIONS

3GPP TR 23.816 V7.0.0 (Mar. 2006); Technical Report; 3rd Generation Partnership Project; Technical Specification Group Services and System Aspects; Identification of Communication Services in IMS (Release 7).
3GPP TS 24.229 V8.1.0 (Sep. 2007); Technical Specification; 3rd Generation Partnership Project; Technical Specification Group Core Network and Terminals; IP multimedia call control protocol based on Session Initiation Protocol (SIP) and Session Description Protocol (SDP); Stage 3 (Release 8).
3GPP TSG CT WG1 Meeting #47, Beijing, China, May 7-11, 2007. Title: Categories of service identification.
J. Rosenberg; SIP, Internet-Draft, Intended Status: Standards Track, Expires: Oct. 3, 2007; "A Session Initiation Protocol (SIP) Media Feature Tag for MIME Application Sub-Types draft-rosenberg-sip-app-media-tag-00". Apr. 2007.
J. Rosenberg et al.; Network Working Group, Request for Comments: 3261, Obsoletes: 2543, Category: Standards Track; "SIP: Session Initiation Protocol". Jun. 2002.
J. Rosenberg et al.; Network Working Group, Request for Comments: 3264, Obsoletes: 2543, Category: Standards Track; "An Offer/Answer Model with the Session Description Protocol (SDP)"; Jun. 2002.
OMA Open Mobile Alliance, OMA PoC Control Plane Draft Version 2.0—Apr. 26, 2007; OMA-TS-PoC_ControlPlane-V2_0-2007026-D.

(Continued)

*Primary Examiner* — Nizar Sivji
(74) *Attorney, Agent, or Firm* — Schiff Hardin LLP

(57) ABSTRACT

A method for communication setup including transmitting a first message including an indication of a list with a plurality of list elements, wherein each list element specifies a communication service or a communication application computer program; receiving the first message; selecting at least one of the list elements; and transmitting a second message comprising an indication specifying which list element has been selected.

21 Claims, 12 Drawing Sheets

(56) References Cited

OTHER PUBLICATIONS

OMA Open Mobile Alliance, OMA PoC Control Plane Draft Version 2.0—Apr. 26, 2007, Open Mobile Alliance OMA-TS-PoC_ControlPlane-V2_0-20070426-D.

G. Klyne, Network Working Group, Request for Comments: 2533, Category: Standards Track; "A Syntax for Describing Media Feature Sets"; Mar. 1999.

M. Handley et al., Network Working Group, Request for Comments: 2327, Category: Standards Track; "SDP: Session Description Protocol"; Apr. 1998.

T-REC-H[1].323.200606-I!!PDF-E.txt, International Telecommunication Union, ITU-T H.323, Telecommunication (Jun. 2006) Standardization Sector of ITU, Series H: Audiovisual and Multimedia Systems, Infrastructure of audiovisual services—Systems and terminal equipment for audiovisual services. Packet-based multimedia communications systems, ITU-T Recommendation H.323.

* cited by examiner

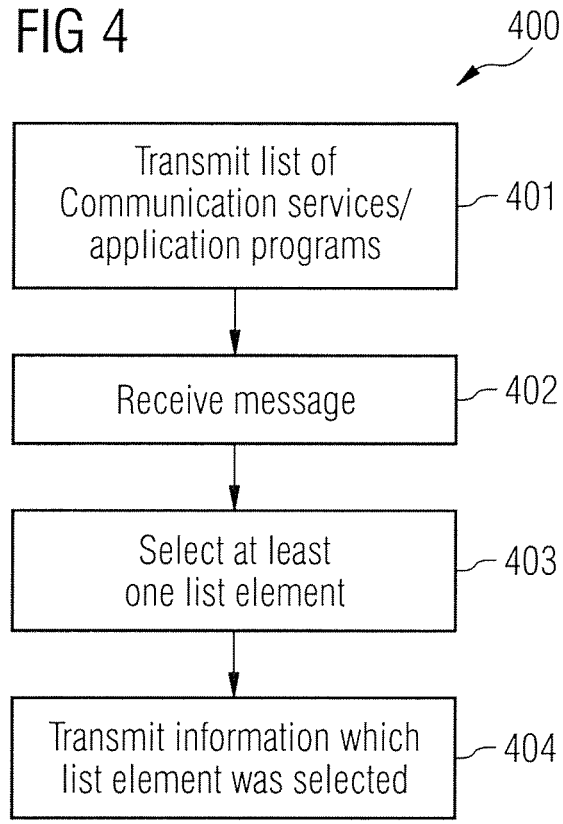
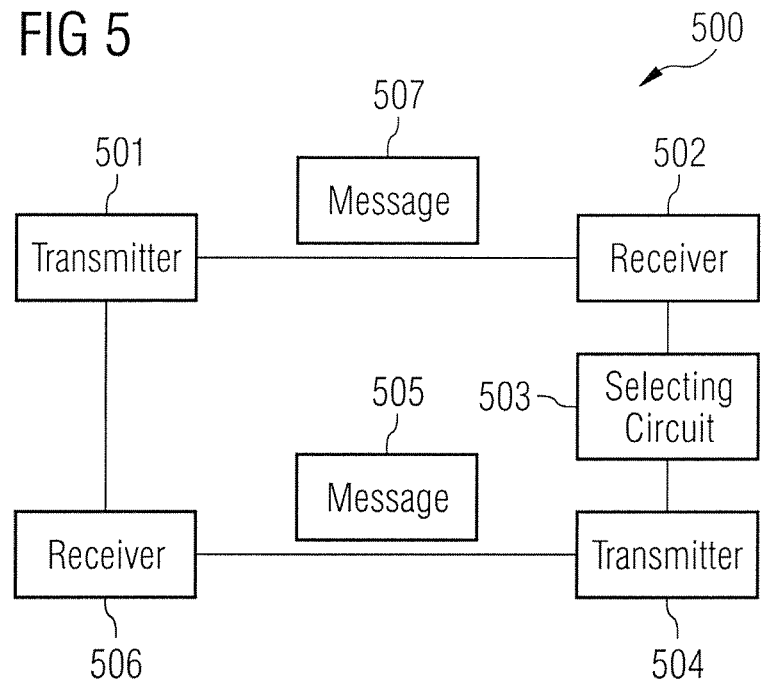

FIG 8

```
v=0
o=alice 2890844730 2890844730 IN IP4
       host.example.com
s=-
c=IN IP4 host.example.com
t=0 0
a=ServID:IM ─── 802
a=AppID:DOWNLOAD_IM_APP ─── 803
a=AppID:OPERATOR_IM_APP ─── 804 m=message 49170 cpim/tcp text/plain text/html
i=text message
```

FIG 9

```
v=0
o=imoperator 2890844526 2890844526 IN IP4
       host.anywhere.com
s=-
c=IN IP4 host.anywhere.com
t=0 0
a=ServID:IM
a=AppID:DOWNLOAD_IM_APP ─── 901 m=message 49170 cpim/tcp text/plain text/html
i=text message
```

FIG 10

```
v=0
o=alice 2890844730 2890844730 IN IP4
     host.example.com
s=-
c=IN IP4 host.example.com
t=0 0
a=ServID:IM
a=AppID:DOWNLOAD_IM_APP       ─ 1001 m=message 49170 cpim/tcp text/plain text/html
i=text message
```

FIG 11

```
v=0
o=imoperator 2890844526 2890844526 IN IP4
     host.anywhere.com
s=-
c=IN IP4 host.anywhere.com
t=0 0
a=ServID:IM  ─ 1101 m=message 49170 cpim/tcp text/plain text/html
i=text message
```

FIG 14

```
v=0
o=alice 2890844730 2890844730 IN IP4
     host.example.com
s=-
c=IN IP4 host.example.com
t=0 0
a=ServID:SPEECH         —1402
a=AppID:CHESS_APP       —1403
a=AppID:SPEECH_APP      —1404
a=PeerAppID:CHESS_APP   —1405
a=PeerAppID:SPEECH_APP  —1406   1401 m=audio 49170 RTP/AVP 0
a=rtpmap:0 PCMU/8000
i=chess speech
```

FIG 15

```
v=0
o=imoperator 2890844123 2890844123 IN IP4
     host.anywhere.com
s=-
c=IN IP4 host.anywhere.com
t=0 0
a=ServID:SPEECH     —1501
a=AppID:CHESS_APP   —1502
a=AppID:SPEECH_APP  —1503 m=audio 49170 RTP/AVP 0
a=rtpmap:0 PCMU/8000
i=chess speech
```

```
v=0
o=bob 2890844456 2890844456 IN IP4
     host.example.com
s=-
c=IN IP4 host.example.com
t=0 0
a=ServID:SPEECH      — 1601
a=AppID:CHESS_APP    — 1602 m=audio 49170 RTP/AVP 0
a=rtpmap:0 PCMU/8000
i=chess speech
```

```
v=0
o=imoperator 2890844526 2890844526 IN IP4
     host.anywhere.com
s=-
c=IN IP4 host.anywhere.com
t=0 0
a=ServID:SPEECH         — 1701
a=AppID:CHESS_APP       — 1702
a=AppID:SPEECH_APP      — 1703
a=PeerAppID:CHESS_APP   — 1704 m=audio 49170 RTP/AVP 0
a=rtpmap:0 PCMU/8000
i=chess speech
```

FIG 18

1800 v=0
o=alice 2890844730 2890844730 IN IP4
      host.example.com
s=-
c=IN IP4 host.example.com
t=0 0
a=ServID:SPEECH
a=AppID:CHESS_APP  —1801
a=PeerAppID:CHESS_APP m=audio 49170 RTP/AVP 0
a=rtpmap:0 PCMU/8000
i=chess speech

FIG 19

1900 v=0
o=imoperator 2890844123 2890844123 IN IP4
      host.anywhere.com
s=-
c=IN IP4 host.anywhere.com
t=0 0
a=ServID:SPEECH
a=AppID:SPEECH_APP  —1901 m=audio 49170 RTP/AVP 0
a=rtpmap:0 PCMU/8000
i=chess speech

FIG 20
2000

```
v=0
o=imoperator 2890844526 2890844526 IN IP4
     host.anywhere.com
s=-
c=IN IP4 host.anywhere.com
t=0 0
a=ServID:IM SPEECH
a=AppID:OPERATOR_IM_APP CHESS_APP      — 2001
a=AppID:OPERATOR_IM_APP SPEECH_APP     — 2002 m=message 49170 cpim/tcp text/plain text/html
i=text message m=audio 49170 RTP/AVP 0
a=rtpmap:0 PCMU/8000
i=chess speech
```

FIG 21
2100

| | |
|---|---|
| Request-URI | sip: SpeechServiceURI.networkA.net |
| SIP HEADERS | 2101 |
| Accept-Contact: | +sip.serv-id="speech" |
| Contact: — 2102 | <sip:Chess-ClientA.networkA.net>;+sip.app-id="chess-app, speech-app" |
| Supported: | Timer |
| Session-Expires: | 1800;refresher=uac |
| Allow: | INVITE,ACK,CANCEL,BYE,REFER, SUBSCRIBE,NOTIFY,OPTIONS |
| SDP PARAMETERS | |
| c= | IN IP6 5555::aaa:bbb:ccc:ddd |
| m= | audio 49170 RTP/AVP 0 |
| a= | rtpmap:0 PCMU/8000 |
| i= | Chess speech |

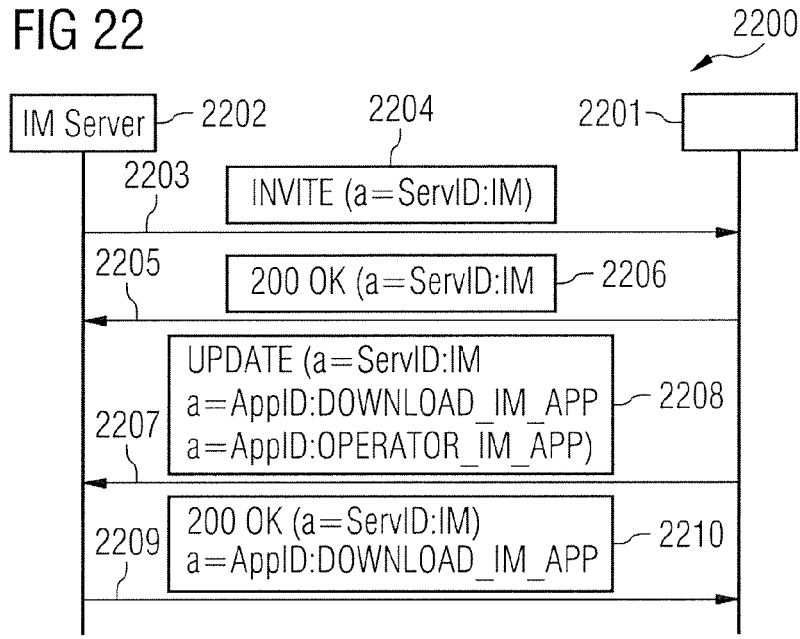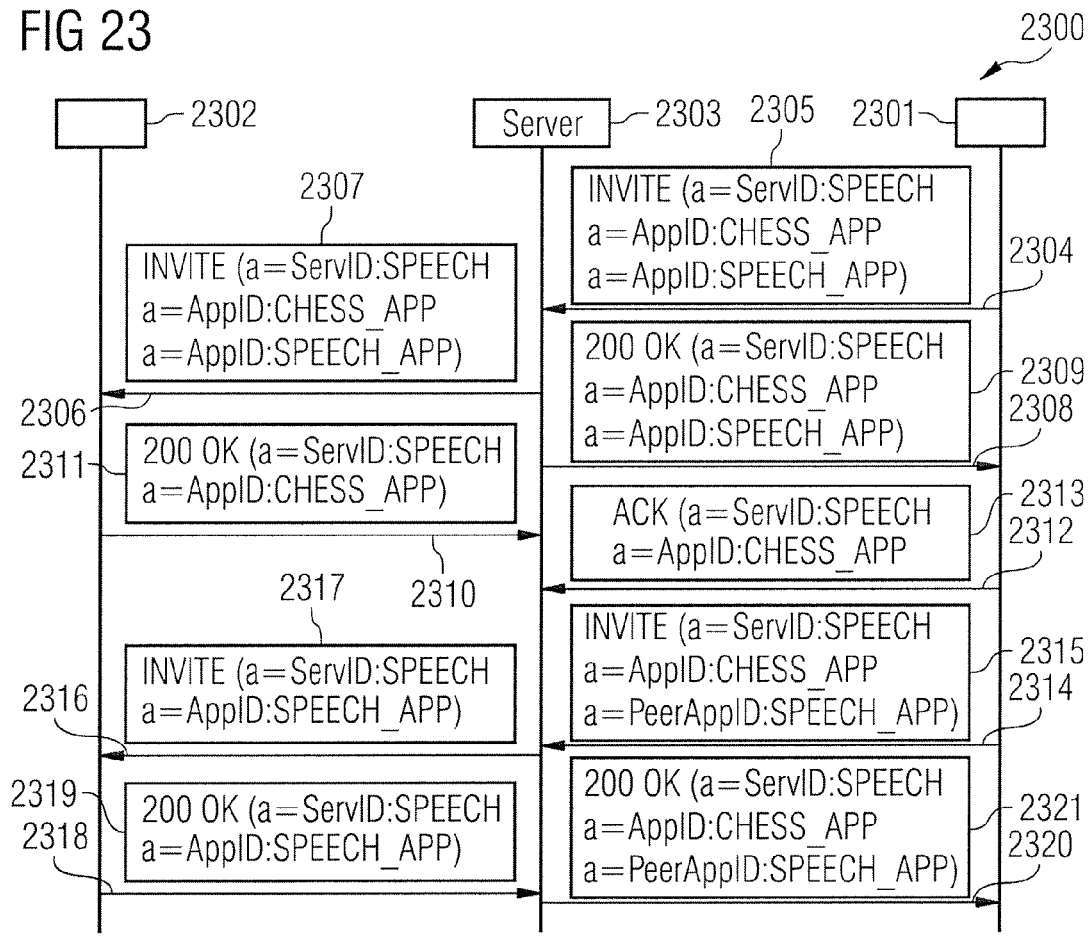

FIG 24 v=0
o=imoperator 2890844526 2890844526 IN IP4
   host.anywhere.com
s=-
c=IN IP4 host.anywhere.com
t=0 0
a=ServID:SPEECH
a=ApplD:CHESS_APP
a=PeerApplD:SPEECH_APP — 2401
a=PeerApplD:CHESS_APP — 2402 m=audio 49170 RTP/AVP 0
a=rtpmap:0 PCMU/8000
i=chess speech

METHOD AND DEVICE FOR COMMUNICATION SETUP

TECHNICAL FIELD

Embodiments of the invention relate generally to a method for communication setup, a system for communication setup, and communication devices.

BACKGROUND

In modern communication systems, communication terminals may be provided with a multiplicity of communication services. Methods for the efficient setup of communications for using such communication services are desirable.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows a flow diagram according to an embodiment of the invention;

FIG. 5 shows a communication system according to an embodiment of the invention;

FIG. 8 shows the SDP content included in the body of a 200 OK message according to an embodiment of the invention;

FIG. 9 shows the SDP content included in the body of an ACK message according to an embodiment of the invention;

FIG. 10 shows the SDP content included in the body of a 200 OK message according to an embodiment of the invention;

FIG. 11 shows the SDP content included in the body of an ACK message according to an embodiment of the invention;

FIG. 14 shows the SDP content included in the body of an INVITE message according to an embodiment of the invention;

FIG. 15 shows the SDP content included in the body of an INVITE message according to an embodiment of the invention;

FIG. 16 shows the SDP content included in the body of a 200 OK message according to an embodiment of the invention;

FIG. 17 shows the SDP content included in the body of a 200 OK message according to an embodiment of the invention;

FIG. 18 shows the SDP content included in the body of an ACK message according to an embodiment of the invention;

FIG. 19 shows the SDP content included in the body of an INVITE message according to an embodiment of the invention;

FIG. 20 shows the SDP content included in the body of a SIP message according to an embodiment of the invention;

FIG. 21 shows the message format of a SIP message according to an embodiment of the invention;

FIG. 22 shows a message flow diagram according to an embodiment of the invention;

FIG. 23 shows a message flow diagram according to an embodiment of the invention; and FIG. 24 shows the message format of an SIP message according to an embodiment of the invention.

DESCRIPTION

Figure 1:
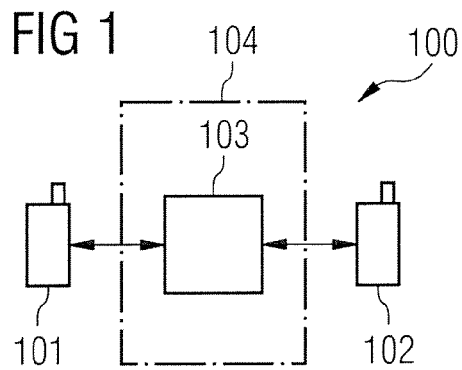
FIG. 1 shows a communication system according to an embodiment of the invention.

FIG. 1 shows a communication system 100 according to an embodiment of the invention.

The communication system 100 includes a first communication terminal 101, a second communication terminal 102, and a communication network 104 including a communication server 103.

The communication server 103, which may generally also be another communication network element of the communication network 104, provides communication services for the communication terminals 101, 102, such as data transfer services, information services, or controlling services for controlling communication functionalities of the communication system 100. The communication terminals 101, 102 are for example mobile communication terminals which may communicate with the communication server 103 using the radio access network of the mobile communication network 104 which is for example a mobile radio communication network according to GSM (Gglobal System for Mobile Communications), UMTS (Universal Mobile Telecommunications System), FOMA (Freedom of Mobile Access), or CDMA2000 (CDMA: Code Division Multiple Access).

Some functionalities which are supported by the communication server 103 may be limited when using communication terminals 101, 102. This means that for example, functionalities provided by the communication server 103 cannot be used by a communication terminal 101, 102 because the user of the communication terminal 101, 102 is not allowed to use the functionality, for example because he is not registered for the functionality or because the communication terminal 101, 102 does not have the necessary capabilities. Overall, the communication service which may be used by the user of a communication terminal 101, 102 is defined by the capabilities of the communication terminal 101, 102 and the capabilities of the communication server 103 (generally the communication network elements providing the communication service).

The capabilities of the communication terminal 101, 102 are for example defined by the capabilities of the application (communication application computer program) which is installed on the communication terminal and used for using the communication service. The capabilities of the communication server 103 are for example defined by the characteristics of the communication service provided by the communication server 103.

For providing a user with desired functionalities, the capabilities of the communication terminal 101, 102 of the user and the capabilities of the communication server 103 should be chosen such that they are compatible with each other and allow the desired functionality. For charging the user for the usage of certain functionalities, which is for example carried out by an element of the communication network 104 which may also be part of the communication server 103, the network element is informed about the functionalities that the communication terminal 101, 102 has made use of.

For identifying applications used by a communication terminal 101, 102 to use a communication service, e.g. for participating in a communication session, application identifiers may be used. Similarly, communication services provided by the communication server 103 may be identified using communication service identifiers. Application identifiers can be used for associating data with an application. For this purpose, the data are provided with the application identifier. For example, if a communication terminal 101, 102 receives data provided with a certain application identifier, the receiver of the communication terminal 101, 102 forwards the data to the application installed on the communication terminal 101, 102 identified by the application identifier.

A communication terminal 101, 102 can for example request a communication service by registering for the communication service at the communication server 103. For specifying for which communication services it should be registered, the communication terminal can make use of the communication identifier associated with the communication service.

A communication terminal 101, 102 or the communication server 103 may request the usage of an application from another communication terminal 101, 102 by transmitting the application identifier of the application when the communication service for which the application should be used is initialized.

When the first communication terminal 101 and the second communication terminal 102 have a communication session, for example provided by the communication server 103 which for example provides a speech communication service, the communication terminals 101, 102 may modify the characteristics of the communication session by using the offer/answer model with the session description protocol (SDP). This is illustrated in FIG. 2

Figure 2:
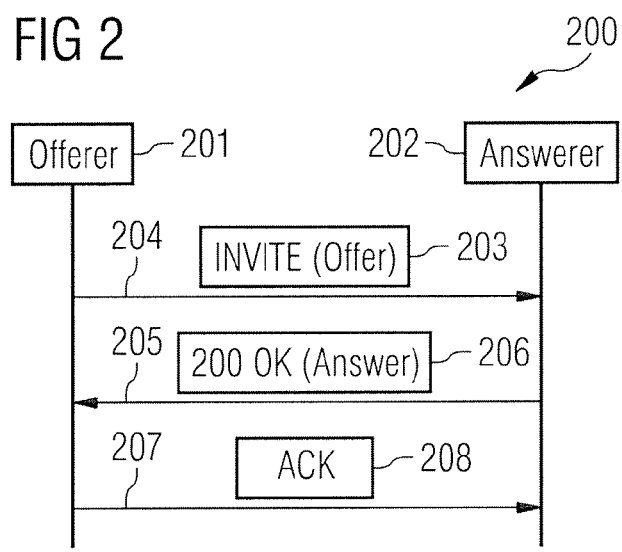
FIG. 2 shows a message flow diagram.

FIG. 2 shows a message flow diagram 200.

The message flow illustrated in the message flow diagram 200 takes place for example between one communication terminal 101, 102 acting as offerer 201 and a communication server 103 acting as answerer 202. Alternatively, the other communication terminal 101, 102 may act as answerer. It is assumed that the offerer 201 and the answerer 202 have a communication session. At any point during the communication session a participant of the communication session, in this example it is assumed that this is the offerer 201, may issue a new offer to modify the characteristics of the communication session. To do this, the offerer 201 sends an INVITE message 203 in 204 to the answerer 202. The INVITE message 203 is an INVITE message according to SIP (Session Initiation Protocol). For example, the offerer 201 offers a plurality of media formats (e.g. speech data, video data, textual data) that may be supported by the communication session, i.e. the data exchanged during the communication session may have. The answerer 202 in 205 answers the offer by transmitting a 200 OK message 206 (according to SIP) to the offerer 201. For example, the answerer 202 selects one of the media formats and signals the selection to the offerer 201. In 207, the offerer 201 acknowledges the selection by sending an ACK message 208 to the answerer 202.

Figure 3:
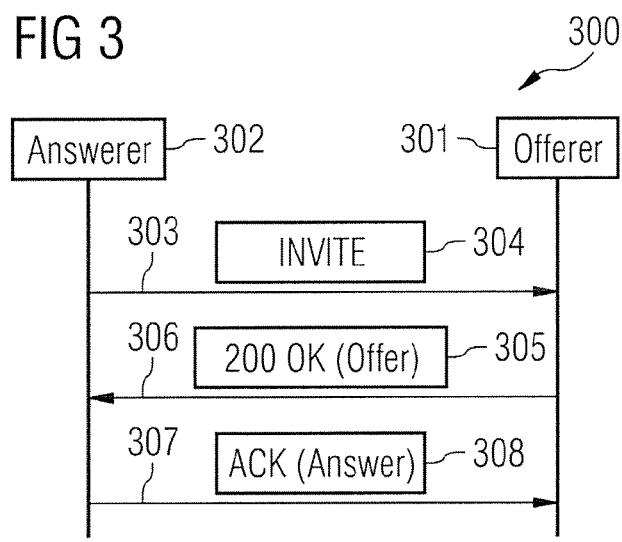
FIG. 3 shows a message flow diagram according to an embodiment of the invention.

An alternative to the message flow shown in FIG. 2 is illustrated in FIG. 3.

FIG. 3 shows message flow diagram 300.

Analogously to the message flow described with reference to FIG. 2, the message flow shown in FIG. 3 takes place between an offerer 301 and an answerer 302. In 303, the answerer sends an INVITE message 304 to the offerer 301. In contrast to the message flow described with reference to FIG. 2, an offer is not included in the INVITE message 304 but in a 200 OK message 305 which is transmitted by the offerer 301 to the answerer 302 in 306.

In 307, the answerer 302 transmits an answer to the offer to the offerer 301 using an ACK message 308. In the example where the plurality of media formats are offered by the offerer 301 for usage in a communication session, the ACK message 308 for example includes a specification of the media formats that the answerer 302 wants to use in the communication session.

The request of communication service from the communication network 104 may require high effort when it is done by registering for the communication service in the case that the communication service to be set up is selected from a plurality of alternatives. In this case the setup may take very long and require a lot of signalling traffic.

In one embodiment, a communication service to be set up and the communication application computer programs used by the communication terminals 101, 102 for using the communication service are negotiated (in other words agreed upon) between the communication terminals 101, 102 and the communication server 103 in such a way that one of the negotiating parties offers one or more communication services and/or communication application programs to the other negotiating party. The other negotiating party selects among the offered communication services/communication application programs and signals the selection to the negotiating party which has offered the communication services and/or communication application programs. The offer and signalling of the selection is for example done according to the offer/answer model that has been described with reference to FIG. 2 and FIG. 3.

Communication services and communication application (computer) programs can be negotiated in a common negotiation. For example, a communication network element such as the communication server 103 offers a plurality of communication services to a communication terminal 101, 102. The communication terminal 101, 102 selects one or more communication services from the offered communication services and informs the communication network element about the selection. This for example is done with a message with which the communication terminal 101, 102 also offers a plurality of communication application programs to the communication network element. The communication network element selects one or more communication application programs from the offered communication application programs and informs the communication terminal 101, 102 about the selection.

Offered communication services or offered communication application programs may be offered in the form of an ordered list. The communication services/communication application programs may be ordered in the list according to a prioritization. For example, communication services/communication application programs which are high up in the list are preferred by the offerer and should be selected by the answerer with priority.

A list of offered communication services and/or computer application programs may be in a hierarchical list which includes identifiers of other lists of communication services and/or communication application programs. To do this, the other lists may be associated with unique identifiers.

A method for communication setup, for example for setting up a communication service, according to an embodiment of the invention is illustrated in FIG. 4.

FIG. 4 shows a flow diagram 400 according to an embodiment of the invention.

In 401, a first message is transmitted including an indication of a list with a plurality of list elements wherein each list element specifies a communication service or a communication application computer program.

In 402, the first message is received.

In 403, at least one of the list elements is selected (e.g. by the receiver) and in 404, a second message including an indication specifying which list element has been selected is transmitted (e.g. to the other side, i.e. to the device that has transmitted the first message).

Illustratively, in one embodiment, a plurality of communication services and/or application (computer) programs are signaled from which one or more communication services and/or application programs are selected. The selection is then signalled back. The signalling of the list can be seen as an offer and the signalling of the selection as an answer. In one embodiment of the invention, this communication is carried out in accordance with the SIP offer/answer model described above. The second message is for example received by an element of a communication network that provides a communication service that is specified by a list element or which is used by an application program specified by a list element. In this way, the communication network element may automatically be informed about the selection. By choosing the list elements of the list accordingly, the sender of the first message, e.g. an offerer, may request the usage of certain communication services and/or application programs.

The first message is for example generated according to a call control protocol. Also, the second message may be generated according to the call control protocol. The call control protocol is for example SIP or H.323.

In one embodiment, at least one list element is selected that specifies a communication application computer program that is selected in this way.

For example, a communication service is provided and the selected communication application computer program is to be used by a communication terminal for using the communication service. The communication service is for example a communication service for the communication of two communication terminals.

According to one embodiment, the list is an ordered list and the order of the list elements specifies a prioritization of the list elements which is taken into account in the selection. By choosing the order of the list elements of the list accordingly, the sender of the first message, e.g. an offerer, may indicate communication services and/or application programs the usage of which is preferred or the usage of which is suggested.

The indication of the list may be an identifier of a predefined list.

A communication system carrying out the method described with reference to FIG. 4 is illustrated in FIG. 5.

FIG. 5 shows a communication system 500 according to an embodiment of the invention.

The communication system 500 includes a first transmitter 501 configured to transmit a first message 507 including an indication of a list with a plurality of list elements, wherein each list element specifies a communication service or a communication application computer program, a receiver 502 configured to receive the first message and a selecting circuit 503 configured to select at least one of the list elements.

The communication system 500 further includes a second transmitter 504 configured to transmit a second message 505, for example to another receiver 506 coupled to the first transmitter 501, including an indication specifying which list element has been selected.

A circuit can be a hardware circuit, e.g. an integrated circuit, designed for the respective functionality or also a programmable unit, such as a processor, programmed for the respective functionality. A processor may be for example a RISC (reduced instruction set computer) processor or a CISC (complex instruction set computer) processor.

A memory used in the embodiments of the invention may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

The first transmitter 501 and the other receiver 506 are for example part of a communication device and the receiver 502, the selecting circuit 503 and the second transmitter 504 are for example part of another communication device.

The communication device or the other communication device is for example an element of a communication network or a (mobile) communication terminal.

In one embodiment, the communication device or the other communication device is a communication (service) server which may be configured to provide at least a communication service specified by one of the list elements.

In the following, some exemplary application scenarios are described.

As an example, it is assumed that the communication server 103 provides an instant messaging communication service to the communication terminals 101, 102 such that the communication system 100 forms an instant messaging communication system.

It is assumed that the first communication terminal 101 supports two instant messaging application programs. This means that two different instant messaging application programs are installed on the first communication terminal 101 and may be used by the user of the first communication terminal 101 to use the instant messaging communication service. For example, one of the instant messaging applications was pre-installed on the first communication terminal 101 by the operator of the communication system 100 and the second instant messaging application has been downloaded and installed by the user of the first communication terminal.

It is assumed that the user of the second communication terminal 102 invites the user of the first communication terminal 101 to an instant messaging communication session. The signalling flow between the communication server 103 and the first communication terminal 101 is illustrated in FIG. 6.

Figures 6, 7:
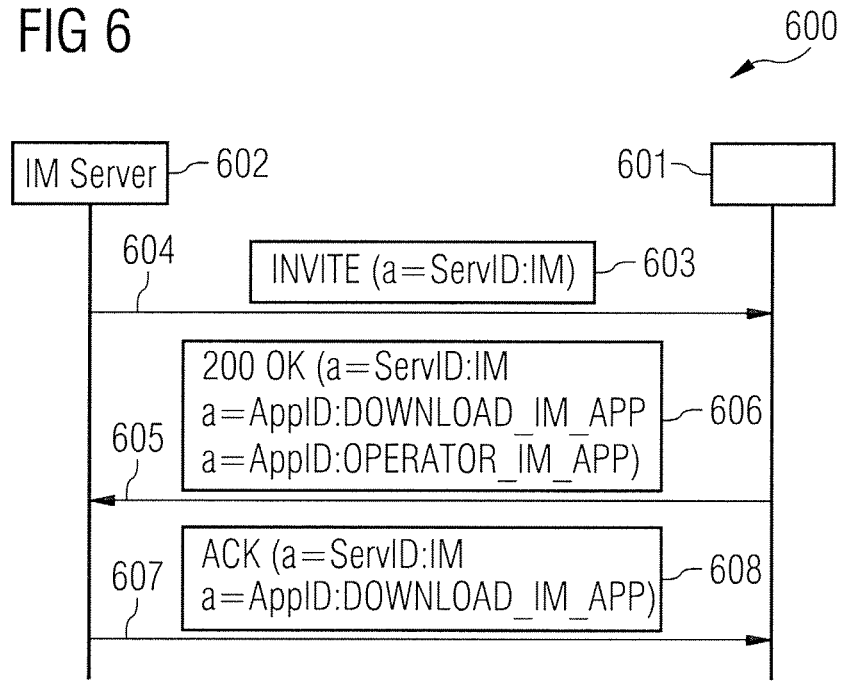
FIG. 6 shows a message flow diagram according to an embodiment of the invention.
FIG. 7 shows the SDP content included in the body of an INVITE message according to an embodiment of the invention.

FIG. 6 shows a message flow diagram 600 according to an embodiment of the invention.

The message flow takes place between a communication terminal 601 corresponding to the first communication terminal 101 and an instant messaging server 602 corresponding to the communication server 103.

The second communication terminal 102 transmits an INVITE message (according to SIP) to the instant messaging server 602 for inviting the communication terminal 601 to a communication session which is forwarded in 604 by the instant messaging server 602 to the communication terminal 601. The INVITE message 603 is illustrated in detail in FIG. 7.

FIG. 7 shows the SDP content 700 included in the body of an INVITE message according to an embodiment of the invention.

The INVITE message includes a session description according to SDP (session description protocol). Among others, in a section 701 of the session description the type of the media data to be exchanged in the communication session is described.

Further, the SDP content 700 includes an element in the form of an a-line 702 (according to SDP) specifying the communication service provided by the instant messaging server 602, in this case instant messaging which is abbreviated by IM.

It is assumed that the user of the first communication terminal 601 accepts the invitation to the communication session and transmits, in 605, a 200 OK message 606 according to SIP to the instant messaging server 602 by which it is signalled that the first communication terminal 101 agrees to the invitation.

The SDP content included in the body of the 200 OK message 606 is shown in detail in FIG. 8.

FIG. 8 shows the SDP content 800 included in the body of a 200 OK message according to an embodiment of the invention.

The SDP content 800 of the 200 OK message includes, similarly to the SDP content 700 of the INVITE message, a session description section 801 specifying the type of data that may be exchanged using the communication service provided by the instant messaging server 602.

Further, the SDP content 800 of the 200 OK message includes an element in form of a first a-line 802 specifying the instant messaging service provided by the instant messaging server 602. The first a-line signals to the instant messaging server 602 that the first communication terminal 101 accepts the offered instant messaging communication service and it accepts the type of media data offered to be exchanged in course of the instant messaging communication session.

Additionally the SDP content 800 of the 200 OK message includes a list in the form of a second a-line 803 and a third a-line 804 specifying instant messaging application programs available on the first communication terminal for taking part in the communication session. With the second a-line 803 and the third a-line 804 the two applications (the application pre-installed by the operator and the application downloaded by the user) are offered to the instant messaging server 602.

It is assumed that the user of the first communication terminal prefers to use the instant messaging application that he has downloaded himself onto the first communication terminal 101. To signal this to the instant messaging server 602, the instant messaging application downloaded by the user of the first communication terminal 101 is specified by the a-line at the top of the list, in this case the second a-line 803. This means that the order in which the two applications are specified in the list consisting of the second a-line 803 and the third a-line 804 signals to the instant messaging server 602 which of the instant messaging applications is preferred by the user of the first communication terminal 101.

It is assumed that the instant messaging server 602 agrees to both applications offered by the first communication terminal 601. Since the application downloaded by the user of the first communication terminal 601 is preferred by the user, the instant messaging server 602 selects this application from the two applications. In 607, the instant messaging server 602 signals this selection with an ACK message 608 according to SIP to the communication terminal 601. The SDP content included in the ACK message 608 is shown in detail in FIG. 9.

FIG. 9 shows the SDP content 900 included in the body of an ACK message according to an embodiment of the invention.

The SDP content 900 of the ACK message includes an a-line 901 specifying the application downloaded by the user. With the a-line 901 it is signalled to the first communication terminal 101 that the instant messaging server 602 has selected the application downloaded by the user from the two applications offered by the communication terminal 601.

In one embodiment, the operator of the communication system 100 charges the usage of communication application programs not provided by the operator himself with an extra fee. Therefore, the instant messaging server 602 stores an application identifier of the selected application and provides this information to the operator of the communication system 100.

Instead of signalling to the instant messaging server 602 that the application downloaded by the user of the communication terminal 601 himself is preferred, it may also be signalled to the instant messaging server 602 that it is required that this application is used by the first communication terminal 101 for participating in the communication session. To do this, only the downloaded application is offered to the instant messaging server 602 in the 200 OK message 606. The SDP content included in the body of the 200 OK message 606 in this case is shown in FIG. 10.

FIG. 10 shows the SDP content 1000 included in the body of a 200 OK message according to an embodiment of the invention.

In this case, the list of applications offered to the instant messaging server 602 only includes one a-line 1001 specifying the application downloaded by the user of the first communication terminal 101.

It may be the case that the operator of the communication system 100 does not accept instant messaging applications which have not been provided by himself. In this case, the instant messaging server 602 responds to the 200 OK message including the SDP content 1000 according to FIG. 10 with an ACK message 608 in which no application is identified. The corresponding message format is shown in FIG. 11.

FIG. 11 shows the SDP content 1100 included in the body of an ACK message according to an embodiment of the invention.

The SDP content 1100 included in the body of the ACK message includes an a-line 1101 specifying the instant messaging service, i.e. an identifier of the instant messaging service, but does not include an a-line specifying an application offered by the communication terminal 601 in the 200 OK message 606. The SDP content 1100 included in the body of the ACK message is interpreted as a denial of the application offered by the communication terminal 601. Consequently, no application is started on the communication terminal 601 and the communication terminal 601 does not participate in the communication session.

As another example, it is assumed that the communication server 103 offers a communication service for exchanging speech data between the first communication terminal 101 and the second communication terminal 102. This means that the communication system 100 is a communication system for speech communication in this example.

In the following application scenario, the communication system 100 is to be used for playing a chess game. For this, the functionality provided by a special chess application installed on the communication terminals 101, 102 may be used. The chess application uses speech recognition to allow the input of moves by the user of the communication terminal 101, 102 on which the chess application is installed and also allows the input of moves made by the user of the other communication terminal 101, 102 by receiving speech messages from the other communication terminal 101, 102 and using speech recognition and executes those moves on a virtual chess board. The architecture is shown in more detail in FIG. 12.

Figure 12:
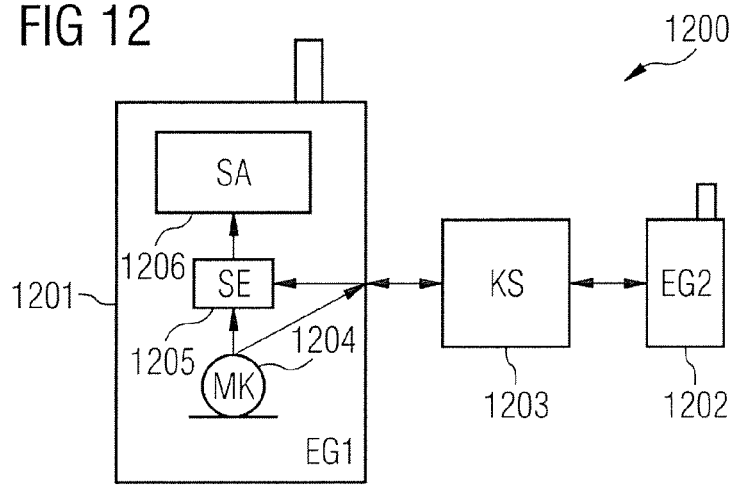
FIG. 12 shows a communication system according to an embodiment of the invention.

FIG. 12 shows a communication system 1200 according to an embodiment of the invention.

The communication system 1200 includes a first communication terminal 1201 corresponding to the first communication terminal 101, a second communication terminal 1202 corresponding to the second communication terminal 102 and a communication server 1203 corresponding to the communication server 103. The functionality of the chess application is described with reference to the first communication terminal 1201 as an example, it works analogously for the second communication terminal 1202.

The first communication terminal 1201 includes a microphone 1204 by which the user of the first communication terminal 1201 may input his chess moves using speech.

The communication terminal 1201 further comprises a speech recognition circuit 1205 which determines the chess moves to be made from the input to the microphone 1204. The moves to be made by the user of the communication terminal 1201 are signalled to a display 1206 which carries out the moves on a virtual chess board that is displayed to the user of the first communication terminal 1201.

The moves by the user of the second communication terminal 1202 are transmitted to the first communication terminal 1201 in the form of speech data which is also supplied to the speech recognition circuit 1205 which determines the moves to be carried out by the pieces of the user of the second communication terminal 1202 and forwards this information to the display 1206. The moves by the user of the second communication terminal 1202 are carried out and the resulting status of the virtual chess board is displayed to the user of the first communication terminal 1201.

It is assumed that the chess application is an application downloaded by the users of the mobile terminals 1201, 1202 which is not known to the operator of the communication system 1200.

The message flow for a set up of a speech communication session for a chess game between the user of the first communication terminal 1201 and the user of the second communication terminal 1202 is explained in the following with reference to FIG. 13.

Figure 13:
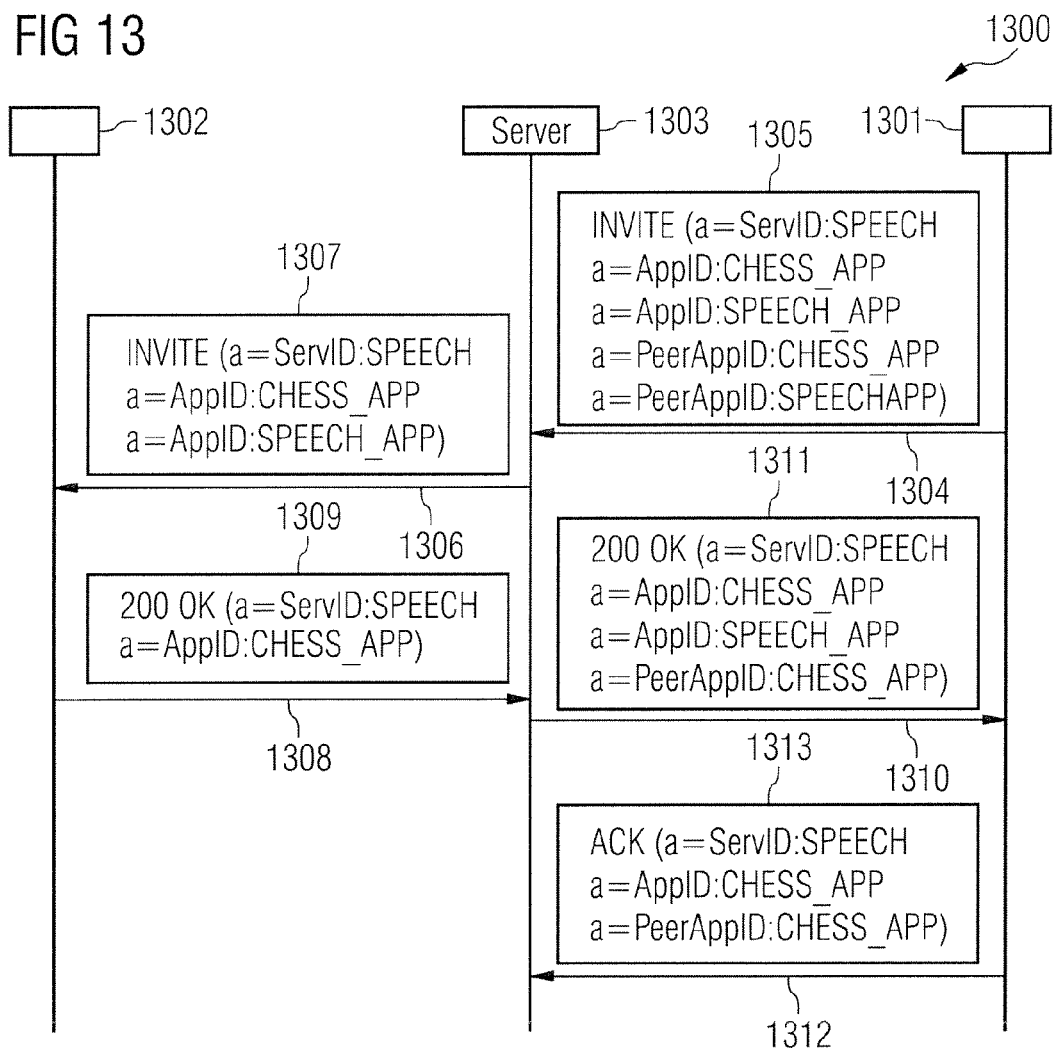
FIG. 13 shows a message flow according to an embodiment of the invention.

FIG. 13 shows a message flow 1300 according to an embodiment of the invention.

The message flow takes place between the first communication terminal 1301 corresponding to the first communication terminal 1201, a second communication terminal 1302 corresponding to the second communication terminal 1202 and a communication server 1303 corresponding to the communication server 1203.

The user of the first communication terminal 1301 wants to invite the user of the second communication terminal 1302 to a speech communication session to play a chess game. To do this, in 1304, the user of the first communication terminal transmits a first INVITE message 1305 to the communication server 1303. The SDP content of the first INVITE message 1305 is shown in detail in FIG. 14.

FIG. 14 shows the SDP content 1400 included in the body of an INVITE message according to an embodiment of the invention.

The SDP content 1400 included in the body of the INVITE message includes a session description section 1401 for specifying audio data as the message format of the media data to be exchanged during the communication session. Further, it includes session description in the form of a first a-line 1402 specifying a speech communication service provided by the communication server 1303 which is requested by the first communication terminal 1301. With a list in the form of a second a-line 1403 and a third a-line 1404, wherein the second a-line specifies the chess application and the third a-line specifies a general application for speech communication available on the first communication terminal, the first communication terminal offers to the communication server 1303 to use the chess application or the speech communication application for the speech communication service.

Further, the SDP content 1400 included in the body of the INVITE message includes a list in the form of a fourth a-line 1405 and a fifth a-line 1406 specifying applications to be used by the communication terminal to be invited to the chess game, i.e. the second communication terminal 1302. The fourth a-line 1405 specifies the chess application and the fifth a-line 1406 specifies the speech communication application.

In 1306, the communication server 1303 invites the second communication terminal 1302 to the chess communication session by sending a second INVITE message 1307 to the second communication terminal 1302.

The SDP content of the second INVITE message 1307 is shown in detail in FIG. 15.

FIG. 15 shows the SDP content 1500 included in the body of an INVITE message according to an embodiment of the invention.

The session description 1500 of the INVITE message includes a first a-line 1501 with which the speech communication service is offered to the second communication terminal 1302. Further, the SDP content 1500 included in the body of the INVITE message includes a list in the form of a second a-line 1502 and a third a-line 1503 with which the chess application and the speech communication application are offered to the second communication terminal to be used for the speech communication session. The offered applications correspond to the applications which have been offered by the first communication terminal in the fourth a-line 1405 and the fifth a-line 1406 of the SDP content 1400 included in the body of the INVITE message of the first communication terminal 1301 which were offered as peer applications, i.e. as applications to be used by the invited communication terminal.

It is assumed that the user of the second communication terminal 1302 selects the chess application as application for participating in the speech communication session. The second communication terminal 1302 signals this to the communication server 1303 in 1308 by sending a first 200 OK message 1309 to the communication server 1303. The SDP content of the first 200 OK message 1309 is shown in detail in FIG. 16.

FIG. 16 shows the SDP content 1600 included in the body of an 200 OK message according to an embodiment of the invention.

The SDP content 1600 included in the body of the 200 OK message includes a first a-line 1601 specifying the speech communication service. By the first a-line 1601 it is signalled to the communication service server 1303 that the offer of the speech communication service is accepted.

Further, the SDP content 1600 included in the body of the 200 OK message includes a second a-line 1602 which specifies the chess application. By the second a-line 1602 it is signalled to the communication server 1303 that the second mobile terminal 1302 has selected the chess application from the offered applications as application to take part in the speech communication application.

In 1310, the communication server 1303 sends a second 200 OK message 1311 to the first communication terminal 1301. The SDP content of the second 200 OK message 1311 is shown in detail in FIG. 17.

FIG. 17 shows the SDP content 1700 included in the body of a 200 OK message according to an embodiment of the invention.

The SDP content 1700 included in the body of the 200 OK message includes a first a-line 1701, a list in the form of a second a-line 1702 and third a-line 1703, and a fourth a-line 1704.

With the first a-line 1701, which specifies the speech communication service, it is signalled to the first communication terminal 1301 that the communication server 1303 acknowledges the request for the speech communication service. With the fourth a-line 1704 the communication server 1303 signals to the first communication terminal 1301 that the second communication terminal 1302 has selected the chess application for participating in the speech communication service. The list including the second a-line 1702 and the third a-line 1703 which specify the chess application and the speech communication application, respectively, indicate that the communication server 1303 allows the first communication terminal 1301 to use the chess application or the speech communication application for participating in the speech communication session.

In 1312, the first communication terminal responds to the second 200 OK message 1311 with an ACK message 1313 whose SDP content is shown in detail in FIG. 18.

FIG. 18 shows the SDP content 1800 included in the body of an ACK message according to an embodiment of the invention.

It is assumed that the user of the first communication terminal 1301 chooses to participate in the speech communication session using the chess application. This is signalled to the communication server 1303 by an a-line 1801 specifying the chess application.

In one embodiment, the communication server 1303 modifies the offer of applications to the second communication terminal 1302. For example, this may happen in the case that the user of the second communication terminal 1302 is not allowed by the operator of the communication system 1300 to use applications not provided by the operator himself. In this case, the communication server 1303 only forwards the offer of the speech communication application to the second communication terminal 1302. The SDP content included in the body of the second INVITE message 1307 in this case is shown in detail in FIG. 19.

FIG. 19 shows the SDP content 1900 included in the body of an INVITE message according to an embodiment of the invention.

In this example, the list of applications offered to the mobile terminal 1302 only includes one list element in the form of an a-line 1901 specifying the speech communication application.

The user of the second communication terminal 1302 may in this case only use the speech communication application for participating in the speech communication session and the chess game. He may receive the moves by the user of the first communication terminal 1301 in form of speech data and may listen to them using a speaker in the second communication terminal 1302 but has to carry them out himself.

More than one communication service to be used by the communication terminals 101, 102 and more than one application for using the communication service or the communication services may be negotiated simultaneously, e.g. within the same message flow. To do this, SIP messages may be used including a-lines that each specify more than one communication service or more than one application. Using one or more a-lines in this way, communication service combinations of more than one communication service or application program combinations of more than one application may be offered by a communication terminal 101, 102 or the communication server 103. An example is shown in FIG. 20.

FIG. 20 shows the SDP content 2000 included in the body of a SIP message according to an embodiment of the invention.

The SDP content 2000 includes a first a-line 2001 specifying an application program for instant messaging and the chess game application described above and a second a-line 2002 specifying the instant messaging application and a speech communication application. The SIP message 2000 is for example used to offer the combination of the instant messaging application and the chess game application or, alternatively, the combination of the instant messaging application and the speech communication application.

In one embodiment, communication services and/or application programs are not specified as above using a list in the form of a-lines according to SDP but are specified by a list indicated in a SIP header. An example is shown in FIG. 21.

FIG. 21 shows the message format of a SIP message 2100 according to an embodiment of the invention.

Feature tags may be used to specify a list of communication services and/or application programs. In this example the SIP message 2100 includes a feature tag 2101 which specifies a speech communication application and the chess game application mentioned above. The SIP message 2100 is for example used to offer the chess game application and the speech communication application.

In this example, the feature tag 2101 is included in the contact header 2102.

Other protocols than SIP may be used for the negotiation of communication services or application programs, for example the protocol H.323.

Communication services and application programs may also be negotiated separately, i.e. using different messages. For example, using a first SIP invite dialog a communication service is negotiated between a communication terminal 101, 102 and the communication server 103. Then, using a SIP re-INVITE dialog or a SIP UPDATE dialog the application program for using the communication service is negotiated. An example is shown in FIG. 22.

FIG. 22 shows a message flow diagram 2200 according to an embodiment of the invention.

The message flow takes place between a communication terminal 2201 corresponding to one of the communication terminals 101, 102 and, for example, an instant messaging server 2202 corresponding to the communication server 103.

In this example, a SIP UPDATE dialog is used for negotiating an application program for using a communication service.

In 2203 the instant messaging server 2202 sends an INVITE message 2204 to the communication terminal 2201 with an offer of the communication service specified in an a-line.

In 2205 the offer is accepted by the communication terminal 2201 using a first 200 OK message 2206.

In 2207 the communication terminal 2201 sends an UPDATE message 2208 to the instant messaging server 2202 including a first a-line specifying a first instant messaging application and a second a-line specifying a second instant messaging application. With the UPDATE message 2208 the communication terminal 2201 offers the first instant messaging application and the second instant messaging application to the instant messaging server 2202 as applications to be used for using the communication service.

The instant messaging server 2202 for example selects the first instant messaging application and sends, in 2209 a second 200 OK message 2210 to the communication terminal 2201 including an a-line specifying the first instant messaging application and thus signalling the selection of the first instant messaging application to the communication terminal 2201.

In one embodiment, the communication services and/or application programs offered in a message are not specified explicitly but are specified using an identifier of a list of communication services and/or applications programs.

The definition of the list is for example stored centrally in a network element, for example in the communication server 103. The definition of the list may be exchanged before or during the negotiation of the communication services and/or application programs. The exchange of the list definition is for example carried out using SIP or SDP. For example, the definition of a list with the name "My-Services" including an instant messaging service and a speech communication service is signalled with a message including the a-line "a=list: My-Services IM SPEECH".

A list, which is for example specified by a list identifier, may include as list elements identifiers of other lists. In this way, hierarchical lists of communication services and/or application programs can be signalled.

In one embodiment, by the identification of the communication service, also a list of application programs associated with this communication service is identified implicitly. For example, the list of application programs identified in this way includes all application programs known to the operator of the communication system 100 which use the communication service identified by the communication service identifier.

The negotiation of communication services and/or application programs between the communication terminals 101, 102 may be carried out separately from the negotiation of communication services and/or application programs between each communication terminal 101, 102 and the communication server 103. For example, in a first SIP INVITE dialog the communication service and the possible application programs are negotiated between one of the communication terminals 101, 102 and the communication server 103. After that, the application program from among the possible application programs to be used for using the communication service is negotiated between the communication terminals 101, 102 using a SIP re-INVITE dialog or a SIP UPDATE dialog. An example is shown in FIG. 23.

FIG. 23 shows a message flow diagram 2300 according to an embodiment of the invention.

The message flow takes place between a first communication terminal 2301 corresponding to the first communication terminal 101, a second communication terminal 2302 corresponding to the second communication terminal 102 and a communication server 2303 corresponding to the communication server 103.

In 2304, the first communication terminal 2301 sends a first INVITE message 2305 to the communication server 2303 with the offer for a communication service and a first application program and a second application program.

In 2306, the communication server 2303 sends a second INVITE message 2307 to the second communication terminal 2302 with the offer for the communication service and the first application program and the second application program.

In 2308, the communication server 2303 sends a first 200 OK message 2309 with which it acknowledges the communication service and the first application program and the second application program, i.e. the communication server 2303 agrees to both application programs.

In 2310, the second communication terminal 2302 sends a second 200 OK message 2311 to the communication server 2303 with which it signals the selection of the first application program, e.g. the chess application program, to be used by itself.

In 2312, the first communication terminal 2301 sends an ACK message 2313 to the communication server 2303 with which it signals the selection of the first application program to be used by itself.

In 2314, the first communication terminal 2301 sends a third INVITE message 2315 to the communication server 2303 specifying that it wishes the second communication terminal 2302 to use the second application, e.g. a speech communication application.

In 2316, the communication server 2303 sends a fourth INVITE message 2317 to the second communication terminal 2302 with which it signals to the second communication terminal 2302 that it should use the second application program.

In 2318, the second communication terminal 2302 sends a third 200 OK message 2319 to the communication server 2303 with which it acknowledges that it uses the second application program for speech data transmission.

In 2320, the communication server 2303 sends a fourth 200 OK message 2321 to the first communication terminal 2301 with which it acknowledges to the first communication terminal 2301 that the second communication terminal 2302 uses the second application.

In one embodiment, the called party, i.e. the communication terminal 101, 102 invited to a communication session (also called invited communication terminal), negotiates with the calling party, i.e. the communication terminal 101, 102 by which it is invited to the communication session (also called inviting communication terminal), the application program to be used by the calling party. If a different application program is negotiated than the application program which was started on the inviting communication terminal 101, 102 the started application program is quit and the application which has been negotiated is started. This could be desirable if both communication terminals 101, 102 should use the same application programs or have to use the same application programs and the inviting communication terminal 101, 102 does not know which application programs are available for the invited communication terminal 101, 102.

In one embodiment, when no application programs are negotiated between the communication terminals 101, 102, the communication server 103 negotiates with the inviting communication terminal 101, 102 which application programs should be used by the invited communication terminal 101, 102.

The selection of application programs by a communication terminal 101, 102 may be carried out according to a preference list or a default selection specified by the user of the communication terminal 101, 102.

The selection of an application program by one of the communication terminals 101, 102 or by the communication server 103 may be carried out taking into account a version number of the possible application programs or the dates of the generation of the possible application programs.

If more than one communication terminal 101, 102 is invited to a communication session and the invited communication terminals 101, 102 select different application programs the selected applications may be signalled to the inviting communication terminal 101, 102 using a plurality of a-lines. An example is shown in FIG. 24.

FIG. 24 shows the SDP content 2400 included in the body of a SIP message according to an embodiment of the invention.

The SDP content 2400 is for example transmitted by the communication server 103 to the inviting communication terminal 101, 102 and comprises a first a-line 2401 specifying an application program selected by an invited communication terminal 101, 102 and a second a-line 2402 specifying another application program selected by another invited communication terminal 101, 102.

The negotiation of communication services and/or application programs may be done directly between the communication terminals 101, 102. This means that the signalling for the negotiation is not necessarily carried out via the communication server 103. Direct negotiations are for example carried out by communication terminals 101, 102 which are not communicating via the communication network 104 but for example via a direct WLAN communication connection or Bluetooth communication connection.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for communication setup, the method comprising:
transmitting a first message comprising a list with a plurality of list elements, wherein each list element specifies a communication service or a communication application computer program, defined by the capabilities of a first communication terminal;
receiving the first message;
selecting at least one of the list elements, wherein the at least one of the list elements is defined by the capabilities of a second communication terminal, wherein the capabilities of the first communication terminal are compatible with the capabilities of the second communication terminal; and
transmitting a second message comprising an indication specifying which list element has been selected,
wherein the list is an ordered list, and the order of the list elements specifies a prioritization of the list elements which is taken into account in the selection.

2. The method according to claim 1,
wherein the first message is generated according to a call control protocol.

3. The method according to claim 1,
wherein the second message is generated according to a call control protocol.

4. The method according to claim 2,
wherein the call control protocol is SIP or H.323.

5. The method according to claim 1,
wherein at least one list element is selected that specifies a communication application computer program that is selected.

6. The method according to claim 5,
wherein a communication service is provided and the selected communication application computer program is to be used by the second communication terminal for using the communication service.

7. The method according to claim 1,
wherein the list is a pre-defined list.

8. A communication device, comprising:
a first transmitter configured to transmit a first message comprising a list with a plurality of list elements defined by the capabilities of the first transmitter, wherein each list element specifies a communication service or a communication application computer program; and
a first receiver configured to receive a second message from a second transmitter comprising an indication specifying a selection of at least one of the list elements, wherein the at least one of the list elements is defined by the capabilities of the second transmitter, wherein the capabilities of the second transmitter are compatible with the capabilities of the first receiver,
wherein the list is an ordered list, and the order of the list elements specifies a prioritization of the list elements which is taken into account in the selection.

9. The communication device according to claim 8,
being a communication terminal or an element of a communication network.

10. The communication device according to claim 8,
being a mobile communication terminal.

11. The communication device according to claim 8,
being a communication service server.

12. The communication device according to claim 11,
being configured to provide at least a communication service specified by one of the list elements.

13. A communication device, comprising:
a first receiver;
a first transmitter;
the first receiver configured to receive a first message from a second transmitter comprising a list with a plurality of list elements, defined by the capabilities of the second transmitter, wherein each list element specifies a communication service or a communication application computer program;
a selecting circuit configured to select at least one of the list elements; and
the first transmitter configured to transmit a second message comprising an indication specifying which list element has been selected, wherein the at least one of the list elements is defined by the capabilities of the first transmitter, wherein the capabilities of the first transmitter are compatible with the capabilities of a second receiver,
wherein the list is an ordered list, and the order of the list elements specifies a prioritization of the list elements which is taken into account in the selection.

14. The communication device according to claim 13,
being a communication terminal or an element of a communication network.

15. The communication device according to claim 13,
being a mobile communication terminal.

16. The communication device according to claim 13,
being a communication service server.

17. The communication device according to claim 16,
being configured to provide at least a communication service specified by one of the list elements.

18. A method for communication setup, comprising:
transmitting a first message comprising a list with a plurality of list elements, wherein each list element specifies a communication service or a communication application computer program, defined by the capabilities of a first communication terminal; and
receiving a second message comprising an indication specifying a selection of at least one of the list elements, wherein the at least one of the list elements is defined by the capabilities of a second communication terminal, wherein the capabilities of the first communication terminal are compatible with the capabilities of the second communication terminal, wherein the list is an ordered list, and the order of the list elements specifies a prioritization of the list elements which is taken into account in the selection.

19. A method for communication setup, comprising:

receiving a first message comprising a list with a plurality of list elements, wherein each list element specifies a communication service or a communication application computer program, defined by the capabilities of a first communication terminal;

selecting at least one of the list elements; and transmitting a second message comprising an indication specifying which list element has been selected, wherein the at least one of the list elements is defined by the capabilities of a second communication terminal, wherein the capabilities of the first communication terminal are compatible with the capabilities of the second communication terminal, wherein the list is an ordered list, and the order of the list elements specifies a prioritization of the list elements which is taken into account in the selection.

20. The method according to claim 1, wherein the at least one of the list elements is further defined by the capabilities of a third communication terminal, wherein the capabilities of the third communication terminal are compatible with the capabilities of the first communication terminal and the capabilities of the second communication terminal.

21. The method according to claim 1, wherein the second communication terminal is a communication server.

* * * * *